United States Patent
Hwang et al.

(10) Patent No.: US 8,543,376 B2
(45) Date of Patent: Sep. 24, 2013

(54) APPARATUS AND METHOD FOR DECODING USING JOINT TOKENIZATION AND TRANSLATION

(75) Inventors: Young Sook Hwang, Seoul (KR); Sang-Bum Kim, Seoul (KR); Chang Hao Yin, Seoul (KR); Xinyan Xiao, Beijing (CN); Yang Liu, Beijing (CN); Qun Liu, Beijing (CN); Shouxun Lin, Beijing (CN)

(73) Assignee: SK Planet Co., Ltd, Seoul (KR)

( * ) Notice: Subject to any disclaimer, the term of this patent is extended or adjusted under 35 U.S.C. 154(b) by 0 days.

(21) Appl. No.: 13/813,463

(22) PCT Filed: May 25, 2011

(86) PCT No.: PCT/KR2011/003830
§ 371 (c)(1),
(2), (4) Date: Jan. 31, 2013

(87) PCT Pub. No.: WO2012/026667
PCT Pub. Date: Mar. 1, 2012

(65) Prior Publication Data
US 2013/0132064 A1 May 23, 2013

(30) Foreign Application Priority Data
Aug. 23, 2010 (KR) .................. 10-2010-0081677

(51) Int. Cl.
*G06F 17/28* (2006.01)
(52) U.S. Cl.
USPC ............. 704/4; 704/2; 704/3; 704/9; 704/277

(58) Field of Classification Search
USPC ........................................ 704/1–9
See application file for complete search history.

(56) References Cited

U.S. PATENT DOCUMENTS

| | | |
|---|---|---|
| 2009/0248422 A1 | 10/2009 | Li et al. |
| 2011/0307245 A1* | 12/2011 | Hanneman et al. ............ 704/4 |
| 2012/0253785 A1* | 10/2012 | Hamid et al. .................. 704/4 |

FOREIGN PATENT DOCUMENTS

| | | |
|---|---|---|
| KR | 10-1999-0001034 | 1/1999 |
| KR | 10-2000-0056245 | 9/2000 |

OTHER PUBLICATIONS

Chung, Tagyoung, and Daniel Gildea. "Unsupervised tokenization for machine translation." Proceedings of the 2009 Conference on Empirical Methods in Natural Language Processing: vol. 2-vol. 2. Association for Computational Linguistics, 2009.*
International Search Report mailed Feb. 6, 2012 for PCT/KR2011/003830.
Written Opinion of the International Searching Authority mailed Feb. 6, 2012 for PCT/KR2011/003830.

* cited by examiner

*Primary Examiner* — Talivaldis Ivars Smits
*Assistant Examiner* — Shaun Roberts
(74) *Attorney, Agent, or Firm* — Lowe Hauptman & Ham LLP

(57) ABSTRACT

Disclosed are a joint decoding apparatus and a joint decoding method that joins a tokenization process and a translation process. More particularly, the present disclosure can generate all available candidate tokens, reduce translation errors, and obtain an optimal translation result by jointly conducting a decoding by simultaneously conducting the tokenization process and the translation process for an input character sequence while decoding.

19 Claims, 6 Drawing Sheets

APPARATUS AND METHOD FOR DECODING USING JOINT TOKENIZATION AND TRANSLATION

CROSS REFERENCE TO RELATED APPLICATION

This application claims the priority of Korean Patent Application No. 10-2010-0081677, filed on Aug. 23, 2010 in the KIPO (Korean Intellectual Property Office). Further, this application is the National Phase application of International Application No. PCT/KR2011/003830 filed May 25, 2011, which designates the United States and was published in Korean.

TECHNICAL FIELD

The present disclosure relates to a joint decoding apparatus that joins a tokenization process and a translation process, and a method for the same, and more particularly, to a joint decoding apparatus for joining a tokenization process and a translation process, and a method for the same that decode an input character sequence jointly by simultaneously conducting tokenization and translation of the input character sequence during decoding. According to the present disclosure, it is possible to generate all available candidate tokens, reduce translation errors, and obtain an optimal translation result.

BACKGROUND ART

A field of a statistical machine translation (SMT) has been evolving. At an early evolving stage, many translation systems were developed as using a word-based approach. That is, the translation system processes words as a basic translation element and replaces each source language word with a target language word to form a translated sentence. The probability of the sentence having the optimal translation result is approximated using a multiplication of probabilities indicating whether each target language work is an optimal translation for a corresponding source language word and using a language model probability for a sentence in the target language. For example, a Markov chain (for example, N-gram) language model is used for determining a language model probability.

Recently, with the advent of a phrase-based statistical machine translation (phrase-based SMT), a significant development has been achieved. By expanding a translation basic unit from words to phrases, a search space may be effectively reduced in the phrase-based statistical machine translation. Here, the phrase refers to a partial character string of several consecutive words.

A general phrase-based statistical machine translation system still has some disadvantages. For example, the general system can definitely perform a translation process of re-arranging several consecutive words recognized through training, but most general translation systems cannot describe a long-distance dependency relationship between words. Further, the translation process uses a hierarchical phrase structure in any approach for the machine translation. For example, synchronous context-free grammars are used both in the source language and the target language. Due to errors in segmentation for the translation and errors in phrase and word alignments for training translation rules, such approach has a problem of deteriorating translation accuracy when an accurate translation rule cannot be applied.

The tokenization process performs an important role in the statistical machine translation because tokenizing a source sentence determines a translation basic unit in the statistical machine translation system.

FIG. 1 is a conceptual diagram illustrating a tokenization process and a translation process in a conventional statistical machine translation system.

As shown in FIG. 1, the conventional statistical machine translation system includes a tokenization unit 110 and a decoder 120. The tokenization unit 110 performs a tokenization process in a pre-processing process. The tokenization unit 110 receives an untokenized character string and then generates a tokenized character string. Further, the decoder 120 receives the tokenized character string from the tokenization unit 110 and finds an optimal translation for the received character string.

Since various language tokenization processes are generally ambiguous, a statistical machine translation system in which the tokenization process is separated from the translation process may often generate translation errors due to errors in the tokenization process. Particularly, a method of segmenting sentences into proper words directly affects the translation performance for some languages such as Chinese which have no space in their writing systems. Further, in agglutinative languages such as Korean, one word may include a plurality of morphemes, so that a serious data spareseness problem may occur when the word itself is used as training data.

The segmentation of words into the unit of morphemes is to effectively improve the translation performance by taking the translation basic unit as the morpheme which is a minimal meaningful unit in various languages. Although a tokenization unit having an excellent performance is used, there is a limitation in improving a translation quality because the performance of the tokenization unit cannot be 100%. Accordingly, a more proper tokenization method of reducing an error problem in the tokenization is required in the statistical machine translation systems.

A lattice structure-based translation method for improving the translation performance corresponds to a method of replacing a 1-best tokenization with an n-best tokenization. However, a word lattice-based translation method still searches for a corresponding word in a limited search space. That is, since the method in which the tokenization process is separated from the decoding and the constructed token lattice relies on tokens filtered and pre-processed before the decoding process, the search space is still limited by the pre-processing process.

The general statistical machine translation systems always separates the tokenization process from decoding process as the pre-processing process, and conducts the decoding process as a separate process. Such a process is not optimized for the statistical machine translation. First, an optimal translation granularity for a given translation language pairs is ambiguous. While the general statistical machine translation system may face a serious data sparseness when using a large granularity, the general statistical machine translation system may lose a plurality of useful information when using a small granularity.

For example, in Chinese "duo fen" and English "gain a point", since Chinese "duo fen" is in a one-to-one alignment with English "gain a point", it is preferable to split "duo fen" into two words such as "duo" and "fen". On the contrary, although Chinese "you" and "wang" are in a one-to-one alignment with English "will have the chance to", it is not preferable to split "you wang" into two words. This is because the decoder 120 tends to translate Chinese "wang" into an English verb "look" without context information "you".

Second, there may be an error in the tokenization process. Chinese "tao fei ke" is recognized as a Chineses name of which family name is "tao" and first name is "fei-ke". However, by considering the context, a full character string "tao fei ke" should be translated as an Indonesian badminton player's name.

Meanwhile, replacing 1-best tokenization result with a lattice constructed using a plurality of tokens which correspond to tokenization results of one or more segmenters is helpful to improve the translation performance. However, the search space is still limited by the lattice constructed with the tokens segmented before the decoding, which is problematic.

DETAILED DESCRIPTION OF DISCLOSURE

Problems To Be Solved

Accordingly, the present disclosure has been made in an effort to solve the above-mentioned problem, and provides a joint decoding apparatus and a method for the same, that decode an input character sequence jointly by simultaneously conducting tokenization and translation of the input character sequence during decoding. According to the present disclosure, it is possible to generate all available candidate tokens, reduce translation errors, and obtain an optimal translation result.

Technical Solution for the Problems

In accordance with a first aspect of the present disclosure, there is provided a joint decoding apparatus for joining a tokenization process and a translation process, where the apparatus is characterized by including: a candidate token generation unit that generates a plurality of candidate tokens by applying a maximum entropy model to an input character sequence; a probability calculation unit that calculates a tokenization probability of each of the generated candidate tokens using a language model; out of vocabularly (OOV) processing unit that processes OOV using a word count and discount information for OOV among the generated candidate tokens; and a translation unit that generates a corresponding phrase corresponding to the input character sequence according to a translation model using calculated probability values of the candidate tokens and a processing result for OOV.

The joint decoding apparatus may preferably further include a translation model database that stores a translation model trained from tokenized data of a parallel bilingual corpus; and a language model database that stores a language model trained from a monolingual corpus.

The translation model database may preferably store a character string-based translation model.

The candidate token generation unit may preferably tag at least one of a character corresponding to a beginning of a word, a character located in a middle position of the word, a character corresponding to an end of the word in the input character sequence, and a word consisting of single character in terms of word generation.

The probability calculation unit may preferably perform a calculation by combining the tokenization probability of each of the generated candidate tokens and an N-gram language model.

The OOV processing unit may preferably control a word count for OOV among the generated candidate tokens.

The translation unit may preferably generate a translated sentence corresponding to the input character sequence by applying the calculated probability values of the candidate tokens and OOV processing result to a log-linear model.

In accordance with a second aspect of the present disclosure, there is provided a method for decoding characterized by including: generating a candidate token by generating a plurality of candidate tokens by applying a maximum entropy model to an input character sequence; calculating a probability by conducting a calculation by combining a tokenization probability of each of the generated candidate tokens and a language model; processing OOV by using a word count and discount information for OOV among the generated candidate tokens; and conducting a translation that generates a corresponding phrase corresponding to the input character sequence by using calculated probability values of the candidate tokens and a processing result for OOV.

The translation model may preferably be a character string-based translation model.

The generating of the candidate token may preferably include tagging at least one of a character corresponding to a beginning of a word, a character located in a middle position of the word, a character corresponding to an end of the word in the input character sequence, and a word consisting of single character in terms of word generation.

The calculating of the probability may preferably include conducting a calculation by combining the tokenization probability of each of the generated candidate tokens and an N-gram language model.

The processing of OOV may preferably include controlling a word count for OOV among the generated candidate tokens.

The conducting of the translation may preferably include generating a translated sentence corresponding to the input character sequence by applying the calculated probability values of the candidate tokens and OOV processing result to a log-linear model.

Advantageous Effects

The present disclosure simultaneously conducts tokenization and translation of the input character sequence during decoding to jointly decode, and as a result, has effects to generate all available candidate tokens, reduce translation errors, and obtain an optimal translation result. That is, according to the present disclosure, it is possible to improve the translation performance and reduce segmentation errors by simultaneously conducting the tokenization process and the translation process through tokenization and searching for corresponding words for a source language character string in a decoding process of the statistical machine translation.

Further, the present disclosure effectively processes the joint tokenization and translation, and moreover, takes a log-linear model to which special features are applied in order to effectively process the OOV problem, and combines the tokenization and translation. As a result, the present disclosure has effects to improve the translation performance as compared to the translation scheme that uses 1-best tokenization and lattices in both translations of Chinese-to-English and Korean-to-Chinese.

For example, according to the present disclosure, it is possible to remarkably improve the capability up to +1.46 BLEU or more in a large-scale Chinese-to-English translation by simultaneously conducting the tokenization process of a source side and the translation process of a target side. Further, according to the present disclosure, there is an effect of reducing a segmentation error of about 8.7% in Chineses words. Furthermore, the present disclosure has an effect of improving the performance of the Korean-to-Chinese translation.

[Description of Major Components of Drawings]

Figure 1:
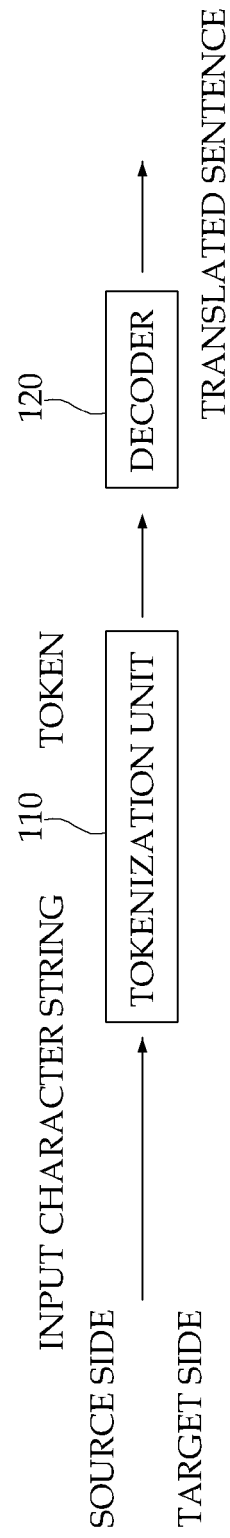
FIG. 1 is a conceptual diagram illustrating a tokenization process and a translation process in a conventional statistical machine translation system.

| | |
|---|---|
| 200: Joint decoding apparatus | 210: Candidate token generation unit |
| 220: Probability calculation unit | 230: OOV processing unit |
| 240: Translation unit | 300: Training apparatus |
| 310: Tokenization unit | 320: Translation model training unit |
| 330: Language model training unit | |

EMBODIMENTS FOR CARRYING OUT THE PRESENT DISCLOSURE

Hereinafter, exemplary embodiments of the present disclosure will be described in detail with reference to the accompanying drawings. It should be noted that the same components refer to the same reference numerals anywhere as possible in the drawings. In the following description, specific detailed matters will be described and are provided for the more overall understanding of the present disclosure. Further, in describing the present disclosure, when it is determined that a detailed description relating to well-known functions or configurations may make the subject matter of the present disclosure unnecessarily ambiguous, the detailed description will be omitted.

Figure 2:
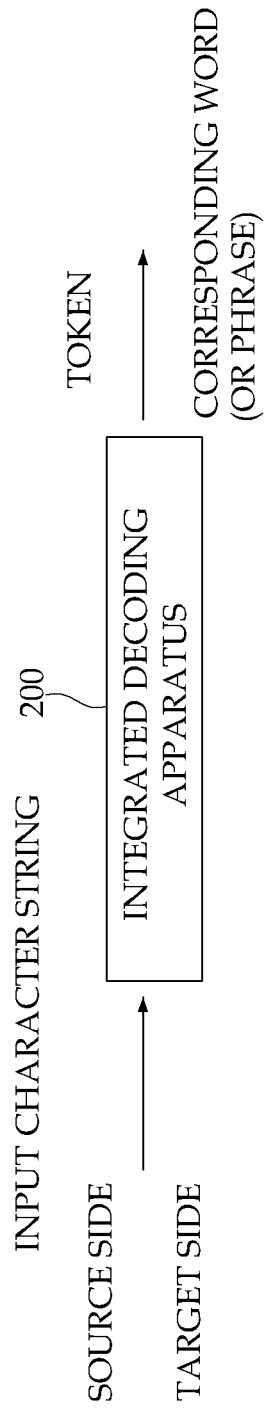
FIG. 2 is a conceptual diagram illustrating an exemplary embodiment of a joint decoding apparatus for jointly conducting a tokenization process and a translation process according to the present disclosure.

FIG. 2 is a conceptual diagram illustrating an exemplary embodiment of a joint decoding apparatus that joins a tokenization process and a translation process according to the present disclosure.

A joint decoding apparatus 200 according to the present disclosure relates to a statistical machine translation, and solves a problem of deteriorating the translation performance due to a different word unit for the translation between difference languages by simultaneously conducting the tokenization process and the translation process. The joint decoding apparatus 200 improves the translation performance by simultaneously conducting the tokenization process for the translation and the translation process while an input character string is decoded. The joint decoding apparatus 200 simultaneously conducts the tokenization process and the translation process during a decoding in order to find the best translation and an optimal token for the input language character string.

As shown in FIG. 2, the joint decoding apparatus 200 receives an input character string by a source side. Further, the joint decoding apparatus 200 simultaneously conducts the tokenization process and the translation process. The joint decoding apparatus 200 can output the character string tokenized at the source side and a corresponding phrase of a target side through a joint process as described above.

Hereinafter, each constitutional element of the joint decoding apparatus 200 in the tokenization process and the translation process according to the present disclosure will be described with reference to FIG. 3.

Figure 3:
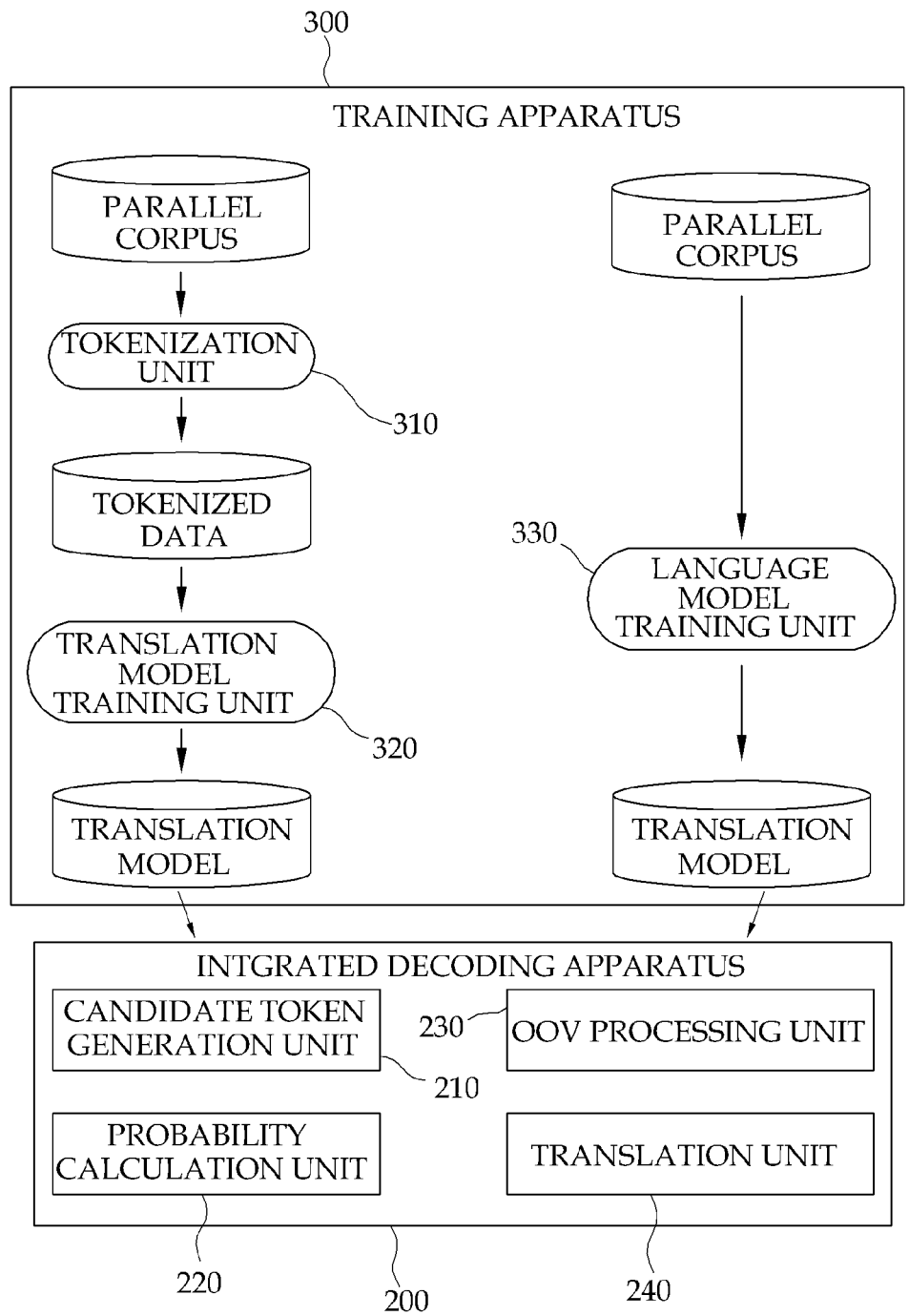
FIG. 3 is a configuration diagram illustrating a joint decoding apparatus in a statistical machine translation system according to the present disclosure.

FIG. 3 is a configuration diagram illustrating an exemplary embodiment of a joint decoding apparatus in a statistical machine translation system according to the present disclosure.

As shown in FIG. 3, a statistical machine translation system includes a training apparatus 300 and the joint decoding apparatus 200. Here, the training apparatus 300 includes a tokenization unit 310, a translation model training unit 320, and a language model training unit 330. Further, the joint decoding apparatus 200 includes a candidate token generation unit 210, a probability calculation unit 220, an OOV processing unit 230, and a translation unit 240.

The joint decoding apparatus 200 jointly conducts the tokenization process and the translation process as a single process in a decoding process. The training apparatus 300 performs a hierarchical phrase-based model for statistical machine translation by using synchronous context free grammar. Here, a model for statistical machine translation applied to the present disclosure is not limited to the hierarchical phrase-based model for statistical machine translation.

First, each constitutional element of the training apparatus 300 will be described below.

The training apparatus 300 receives a parallel corpus and a monolingual corpus.

Further, the tokenization unit 310 generates tokenized data by tokenizing the input parallel corpus.

Subsequently, the translation model training unit 320 trains a translation model by using the tokenized data generated by the tokenization unit 310. Here, the translation model having been trained may be stored in a translation model DB in a database form.

Meanwhile, the language model training unit 330 generates a language model by training the language model by using the monolingual corpus input to the training apparatus 300. Here, the generated language model may be stored in a language model DB.

As shown in FIG. 2, the joint decoding apparatus 200 receives an un tokenized input character string as an input. Further, the joint decoding apparatus 200 tokenizes an input character string of the source side while searching for a corresponding phrase of the target side. Since rules for the hierarchical phrase-based statistical machine translation, that is, translation models include tokenization information, the joint decoding apparatus 200 can simultaneously conduct the translation process of the target side of the translation models and the tokenization process of the source side of the translation models.

Hereinafter, each constitutional element of the joint decoding apparatus 200 will be described below. Here, the joint decoding apparatus 200 may include the translation model database for storing the translation model having been trained from the tokenized data of the parallel corpus or the language model database for storing the language model having been trained from the monolingual corpus. The joint decoding apparatus 200 may further include a character string-based translation model database for storing a character string-based translation model.

The candidate token generation unit 210 generates a plurality of candidate tokens by applying a maximum entropy model to an input character sequence. The candidate token generation unit 210 labels a character by using at least one of a beginning character of a word, a middle character of the word, an end character of the word, and a word having one character in the input character sequence.

The probability calculation unit 220 calculates a synthetic tokenization probability by combining a tokenization probability of each of the candidate tokens generated by the candidate token generation unit 210 and the language model. The probability calculation unit 220 calculates the tokenization probability by using the language model trained by the language model training unit 330. The probability calculation unit 220 can use the language model stored in the language model DB. Here, the probability calculation unit 220 calculates the tokenization probability of each of the generated candidate tokens by using an N-gram model.

The OOV processing unit 230 processes an OOV among the candidate tokens generated by the candidate token generation unit 210 by using a word count of the unregistered word of the OOV and discount information. The OOV processing unit 230 can control a word count of the OOV among the generated candidate tokens.

The translation unit 240 generates a corresponding phrase corresponding to an input character sequence according to a translation model by using probability values of the candidate tokens calculated by the probability calculation unit 220 and an OOV processing result processed by the OOV processing unit 230. The translation unit 240 generates the corresponding phrase corresponding to the input character sequence according to the translation model trained by the translation model training unit 320. The translation unit 240 can use the translation model stored in the translation model DB. The translation unit 240 generates the corresponding phrase corresponding to the input character sequence according to the translation model by log-linearly adding the probability values of the candidate tokens calculated by the probability calculation unit 220 and the OOV processing result processed by the OOV processing unit 230.

Figure 4:
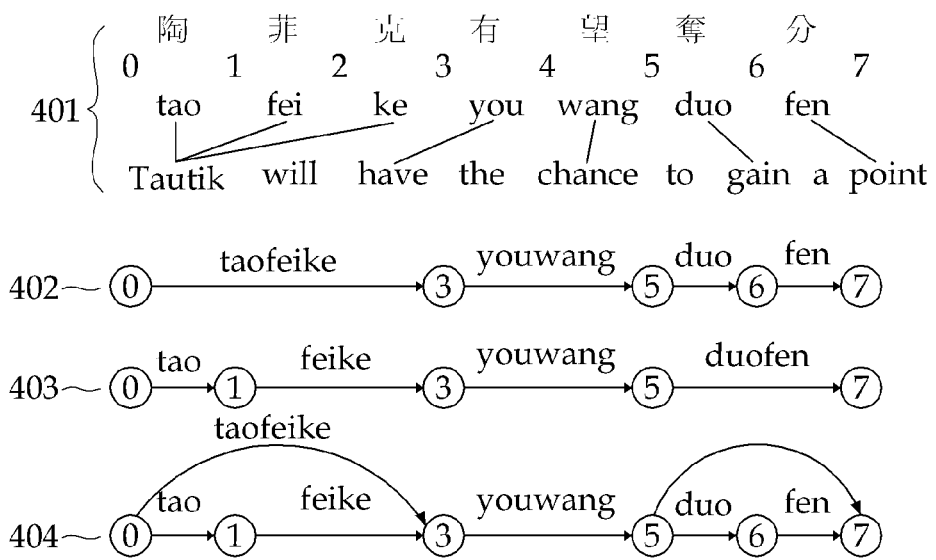
FIG. 4 is an illustrative diagram illustrating an exemplary embodiment of a tokenization process of an input character string applied to the present disclosure.

FIG. 4 is an illustrative diagram illustrating an exemplary embodiment of a tokenization process of an input character string applied to the present disclosure.

As shown in FIG. 4, reference numeral "401" represents an English character string and a corresponding Chinese character string consisting of Chinese. In a case where the Chinese character string is "陶菲克有望夺分" (tao fei ke you wang duo fen) and the English character string is "Taufik will have the chance to gain a point", the tokenization for the Chinese character string and the English character string 401 are as follows. In an example of the character strings 401, there is an alignment relationship between the character string consisting of Chinese and the character string consisting of English.

With respect to such a Chinese sentence, there are tokenization examples 402 and 403 that have been tokenized through different tokenization processes. Further, there is an tokenization example 404 in a form of lattice generated by the different examples 402 and 403.

Figure 5:
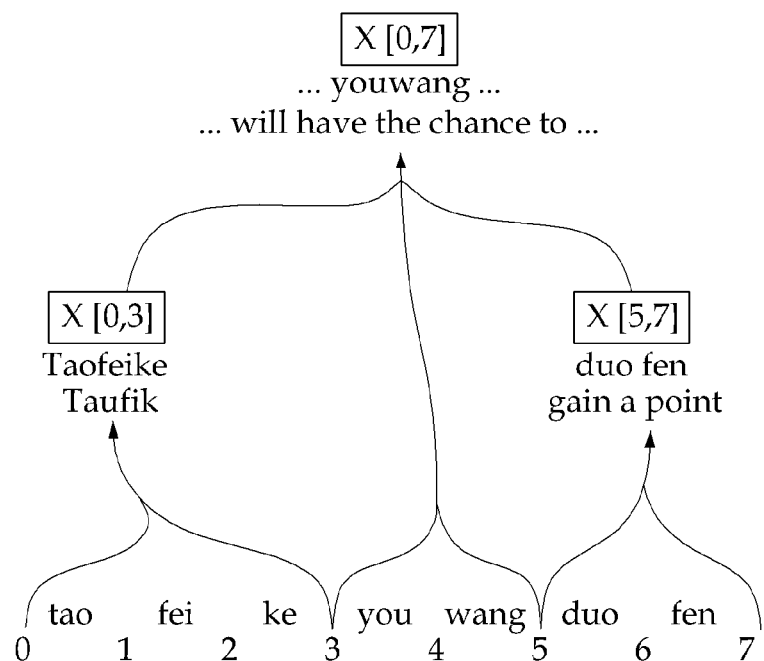
FIG. 5 is an illustrative diagram illustrating an exemplary embodiment of a joint decoding process in a joint decoding apparatus according to the present disclosure.

FIG. 5 is an illustrative diagram illustrating an exemplary embodiment of a joint decoding process in a joint decoding apparatus according to the present disclosure.

As shown in FIG. 5, when the joint decoding apparatus 200 receives the input Chinese character string 401 of FIG. 4, the joint decoding apparatus 200 simultaneously conducts the tokenization process and the translation process by using a translation model shown in [Table 1] below.

TABLE 1

| r1 | tao-fei-ke → Taufik |
| r2 | duo fen → gain a point |
| r3 | x1 you-wang x2 → x1 will have the chance to x2 |

The joint decoding apparatus 200 according to the present disclosure can join translation features and tokenization models within a framework by conducting the tokenization process during the decoding. The joint decoding apparatus 200 complementarily performs the tokenization process and the translation process. The joint decoding apparatus 200 provides optimally tokenized results generated in the tokenization process to the translation process, and helps the tokenization process to remove ambiguousness from the translation process. Formally, a probability of derivation (D) is defined by Equation 1 below.

$$P(D) = \prod_i \phi_i(D)^{\lambda_i}$$ [Equation 1]

In [Equation 1], $\phi_i$ denotes features defined by D including the translation process and the tokenization process, and $\lambda_i$ denotes the feature weights. The joint decoding apparatus 200 uses sixteen features.

In the sixteen features, eight general translation features include four translation model scores (for example, direct and reverse phrase translation scores, and direct and reverse lexical translation scores), a language model of the target side, and three penalties for counts of words constituting the phrase. The eight general translation features indicate frequencies of a trained translation model and an applied special translation rule (glue rule).

Three tokenization features include a maximum entropy model, a language model, and word count of the source side.

Five OOV features are to process an OOV problem. The joint decoding apparatus 200 uses OOV character count (OCC) and four OOV discount (OD) features.

Meanwhile, the candidate token generation unit 210 generates a plurality of candidate tokens by applying the maximum entropy (ME) model to the input character sequence. The maximum entropy model for the tokenization process is generated by conducting the tokenization process using a tagging method. The candidate token generation unit 210 allocates range tags for characters by using the following four types.

In the four types, "b" indicates a beginning character of a word, "m" indicates a middle character of the word, "e" indicates an end character of the word, and "s" indicates single character word. For example, according to a labeling standard, the candidate token generation unit 210 first generates a label sequence "b e" for a token "you-wang" of a character string "you wang". Further, the candidate token generation unit 210 calculates a probability of the tokenization process as defined in [Equation 2].

$$P(you - wang|you\ wang) = P(be|you\ wang) \quad \text{[Equation 2]}$$
$$= P(b|you, you\ wang) \times P(e|wang, you\ wang)$$

Formally, a probability of a character sequence $C_n^1$ having a tag $l_n^1$ is calculated by [Equation 3] below.

$$P(l_n^1|C_n^1) = \prod_{i=1}^{n} p(l_i|C_i, C_n^1) \quad \text{[Equation 3]}$$

Under the maximum entropy model, a probability of assigning a character "C" with a tag "1" is represented by [Equation 4].

$$P(l|C, C_n^1) = \frac{\exp\left[\sum_i \lambda_i h_i(l, c, C_n^1)\right]}{\sum_{l'} \exp\left[\sum_i \lambda_i h_i(l', c, C_n^1)\right]} \quad \text{[Equation 4]}$$

In [Equation 4], $h_i$ denotes a feature, and $\lambda_i$ denotes a corresponding weight.

Meanwhile, in a language model (LM), the probability calculation unit 220 uses a simple and effective n-gram language model for a probability of a token $w_1^L$ having L words. The probability calculation unit 220 calculates the probability of the n-gram language model by using [Equation 5] below.

$$P(w_1^L) = \prod_{i=1}^{L} P(w_i|w_{i-n+1}^{i-1}) \quad \text{[Equation 5]}$$

In [Equation 5], $w_1^L$ denotes the token having the L words. The probability calculation unit 220 calculates a probability of the token shown in the example "402" of FIG. 4 under a 3-gram model according to [Equation 6] below.

$$P(tao - fei - ke) \times P(you - wang|tao - fei - ke) \times \quad \text{[Equation 6]}$$
$$P(duo|tao - fei - ke, you - wang) \times$$
$$P(fen|you - wang, duo)$$

Meanwhile, the OOV processing unit 230 counts a number of words in a token by using word counts (WC). The language model tends to assign higher probabilities to shorter sentences in a biased manner. Such a feature can compensate for a language model score by assigning high probabilities to longer sentences. The OOV processing unit 230 can optimize a token granularity for a corresponding phrase by using such a feature. If a larger granularity is preferred for the translation process, the OOV processing unit 230 can use such a feature to limit a token containing more words.

The OOV processing unit 230 processes an OOV problem. Obviously, the OOV processing unit 230 can process a potential token and corresponding phrase by using only the trained translation model. Here, trained translation models are processed similarly as in the decoding of the translation process. However, using the trained translation model may limit a search space of the potential token. In a sentence "tao fei ke", "taofeike" has the OOV problem. A token "taofeike" cannot be derived within a limited manner. However, the OOV processing unit 230 requires to guarantee that all potential tokens may be derived because such a biased manner deteriorates a performance of the joint decoding apparatus 200.

In order to improve the performance of the joint decoding apparatus 200, the OOV processing unit 230 estimates OOV character count (OCC). The OOV processing unit 230 counts the number of characters contained in OOV by using such OCC features. The OOV processing unit 230 controls the number of characters contained in OOV by the features. For example, "Taofeike" corresponds to an OOV in the derivation of FIG. 5. Further, an OCC feature for the derivation is "3".

Furthermore, the OOV processing unit 230 performs an OOV discount (OD). The OOV processing unit 230 uses OOV discount feature ($OD_i$) to distinguish an opportunity to be a word by using different counts of characters covered by OOV. Here, the OD, refers to the number of OOVs having an ith character. The OOV processing unit 230 uses four $OD_i$. For example, the OOV processing unit 230 expresses the four OD, as "1", "2", "3", and "4+". It is difficult for OD, to distinguish different tokens. If it is assumed that all words in the token "tao fei ke" are OOVs, OD, for the words is equal to that considering "taofeike" corresponding to a total OOV. If the word "taofeike" is OOV, $OD_3$ counts "1".

Figure 6:
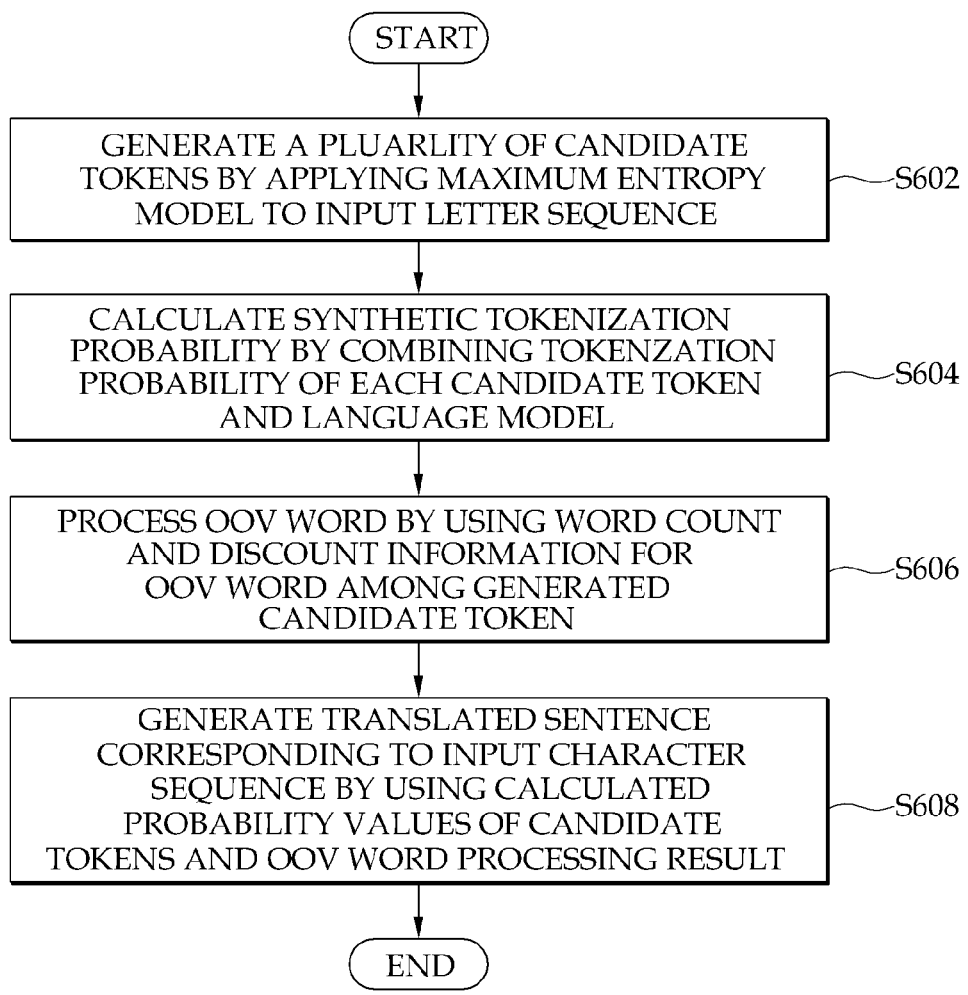
FIG. 6 is a flowchart illustrating an exemplary embodiment of a joint decoding method of jointly conducting a tokenization process and a translation process according to the present disclosure.

FIG. 6 is a flowchart illustrating an exemplary embodiment of a joint decoding method of jointly conducting the tokenization process and the translation process according to the present disclosure.

A translation model and a language model are generated in advance by the training apparatus 300 before the joint decoding by the joint decoding apparatus 200. Here, the translation model is trained from a parallel corpus, and may be a character string-based translation model. Further, the language model is trained from a monolingual corpus. Here, the trained translation model may be stored in a translation model DB in a database form. Further, the trained language model may be stored in a language model DB in a database form.

The candidate token generation unit 210 generates a plurality of candidate tokens by applying a maximum entropy model to an input character sequence (S602). In generating the candidate tokens, the candidate token generation unit 210 tags characters by using at least one of a beginning character of a word, a middle character of the word, an end character of the word, and single character word in the input character sequence.

Further, the probability calculation unit 220 calculates a synthetic tokenization probability by combining a tokenization probability of each of the candidate tokens generated by the candidate token generation unit 210 and the language model (S604). The probability calculation unit 220 can calculate the tokenization probability by using the language model trained by the language model training unit 330. The probability calculation unit 220 can use the language model pre-stored in the language model DB.

The OOV processing unit 230 processes OOV among the candidate tokens generated by the probability calculation unit 220 by using a word count of OOV and discount information (S606). The OOV processing unit 230 can control the word count of OOV and a count according to word discount information among the generated candidate tokens. The word count refers to an average word count capable of constituting a single word, and the OOV processing unit 230 can determine whether to apply OOV by controlling the word count. Further, the OOV processing unit 230 can determine whether to apply OOV by controlling the count according to the word discount information to be "1, 2, 3, and 4+".

The translation unit 240 generates a corresponding phrase corresponding to an input character sequence according to a translation model by using probability values of the candidate tokens calculated by the probability calculation unit 220 and a OOV processing result processed by the OOV processing unit 230 (S608). The translation unit 240 can use the translation model stored in the translation model DB. The translation unit 240 generates the corresponding phrase corresponding to the input character sequence according to a translation model by using the probability values of the candidate tokens calculated by the probability calculation unit 220 and the OOV processing result processed by the OOV processing unit 230.

Meanwhile, the present disclosure can be applied to various reproducing apparatuses by implementing the joint decoding method with a computer software program to be recorded in a predetermined computer readable recording medium.

The various reproducing apparatuses may be, for example, a PC, a notebook, and a portable terminal.

For example, the recoding medium may be either an internal recording media of each reproducing apparatus, such as for example, a hard disk, a flash memory, a RAM, a ROM, or an external recording medium of each reproducing apparatus, such as for example, optical disk such as a CD-R or a CD-RW, a compact flash card, a smart media, a memory stick, or a multimedia card.

In this case, the program recorded in the computer readable recording medium may be executed by including a candidate token generation function of generating the plurality of candidate tokens by applying the maximum entropy model to the input character sequence; a probability calculation function of calculating the tokenization probability of each of the generated candidate tokens by using the language model; an OOV processing function of processing OOV by using the word count for OOV among the generated candidate tokens and discount information; and a translation function of generating the corresponding phrase corresponding to the input character sequence by using the calculated probability values of the candidate tokens and the OOV processing result as described above.

Here, since a detailed technique in each process is the same as the configuration of the joint decoding apparatus and method for joining the tokenization process and the translation process, duplicated descriptions of the technique will be omitted.

Although exemplary embodiments of the present disclosure have been described for illustrative purpose only, those skilled in the art will appreciate that various modifications are possible, without departing from the technical spirit of the disclosure. Therefore, the exemplary embodiments described above should be understood as illustrative not restrictive in all aspects. The present disclosure should be defined by the scope of the appended claims and all techniques fallen within the equivalent range thereof also should be construed as being included in the scope of the invention.

[Industrial Applicability]

The present disclosure can improve a translation performance and reduce a segmentation error by simultaneously conducting a tokenization process and a translation process through tokenization and a search for corresponding words with respect to a source language character string in a decoding process of a statistical machine translation.

The invention claimed is:

1. A joint decoding apparatus that joins a tokenization process and a translation process, the joint decoding apparatus comprising:
a candidate token generation unit configured to generate a plurality of candidate tokens by applying a maximum entropy model to an input character sequence;
a probability calculation unit configured to calculate a tokenization probability of each of the generated candidate tokens by using a language model;
an out of vocabulary (OOV) processing unit configured to process an OOV by using a word count and discount information for the OOV among the generated candidate tokens; and
a translation unit configured to generate a corresponding phrase corresponding to the input character sequence according to a translation model by using calculated probability values of the candidate tokens and an OOV processing result.

2. The joint decoding apparatus of claim 1, further comprising:
a translation model database configured to store a translation model trained from tokenized data of a parallel corpus; and
a language model database configured to store a language model trained from a monolingual corpus.

3. The joint decoding apparatus of claim 2, wherein the translation model database stores a character string-based translation model.

4. The joint decoding apparatus of claim 1, wherein the candidate token generation unit tags at least one of a character corresponding to a beginning of a word, a character located in a middle position of the word, a character corresponding to an end of the word in the input character sequence, and a word consisting of a single character in terms of a word generation.

5. The joint decoding apparatus of claim 1, wherein the probability calculation unit calculates a probability by combining the tokenization probability of each of the generated candidate tokens and an N-gram language model.

6. The joint decoding apparatus of claim 1, wherein the OOV processing unit controls a word count for the OOV among the generated candidate tokens.

7. The joint decoding apparatus of claim 1, wherein the translation unit generates a translated sentence corresponding to the input character sequence by applying the calculated probability values of the candidate tokens and the OOV processing result to a log-linear model.

8. A joint decoding method of joining a tokenization process and a translation process, the joint decoding method comprising:
generating a candidate token by generating a plurality of candidate tokens by applying a maximum entropy model to an input character sequence;
calculating a probability by combining a tokenization probability of each of the generated candidate tokens and a language model;
processing out of vocabularly (OOV) by using a word count and discount information for an OOV among the generated candidate tokens; and
conducting a translation that generates a corresponding phrase corresponding to the input character sequence by using calculated probability values of the candidate tokens and an OOV processing result.

9. The joint decoding method of claim 8, wherein the translation model is a character string based translation model.

10. The joint decoding method of claim 8, wherein the generating of the candidate token comprises tagging at least one of a character corresponding to a beginning of a word, a character located in a middle position of the word, a character corresponding to an end of the word in the input character sequence, and a word consisting of a single character in terms of a word generation.

11. The joint decoding method of claim 8, wherein the calculating of the probability calculates a probability by combining the tokenization probability of each of the generated candidate tokens and an N-gram language model.

12. The joint decoding method of claim 8, wherein the processing of the OOV comprises controlling a word count for the OOV among the generated candidate tokens.

13. The joint decoding method of claim 8, wherein the conducting of the translation generates a translated sentence corresponding to the input character sequence by applying the calculated probability values of the candidate tokens and the 00V processing result to a log-linear model.

14. A non-transitory computer readable recording medium for recording a program for executing the method according to claims 8.

15. A non-transitory computer readable recording medium for recording a program for executing the method according to claim 9.

16. A non-transitory computer readable recording medium for recording a program for executing the method according to claim 10.

17. A non-transitory computer readable recording medium for recording a program for executing the method according to claim 11.

18. A non-transitory computer readable recording medium for recording a program for executing the method according to claim 12.

19. A non-transitory computer readable recording medium for recording a program for executing the method according to claim 13.

* * * * *